United States Patent
Crouse, Jr. et al.

(10) Patent No.: US 7,034,248 B2
(45) Date of Patent: Apr. 25, 2006

(54) METHOD AND APPARATUS FOR CUSTOMIZING LOUVERED BLINDS

(76) Inventors: Edward D. Crouse, Jr., 704 Johnson Mill Rd., Needmore, PA (US) 17238; Blair Sutton, P.O. Box 418, Ottawa, KS (US) 66067

( * ) Notice: Subject to any disclaimer, the term of this patent is extended or adjusted under 35 U.S.C. 154(b) by 121 days.

(21) Appl. No.: 10/649,996

(22) Filed: Aug. 26, 2003

(65) Prior Publication Data
US 2005/0045594 A1    Mar. 3, 2005

(51) Int. Cl.
*B23K 26/00* (2006.01)

(52) U.S. Cl. ............... 219/121.68; 219/121.69; 219/121.82

(58) Field of Classification Search ........... 219/121.72, 219/121.68, 121.69, 121.67, 121.6, 121.85, 219/121.82; 160/166.1, 238; 29/24.5; 427/511
See application file for complete search history.

(56) References Cited

U.S. PATENT DOCUMENTS

| | | | | |
|---|---|---|---|---|
| 2,418,515 A | * | 4/1947 | Lewis | 29/24.5 |
| 2,588,557 A | * | 3/1952 | Morris et al. | 118/503 |
| 2,699,144 A | * | 1/1955 | Peterson | 118/500 |
| 2,827,686 A | * | 3/1958 | Adelman | 29/24.5 |
| 3,197,797 A | * | 8/1965 | Stanley | 15/268 |
| 3,605,614 A | * | 9/1971 | Gilman et al. | 101/126 |
| 4,515,201 A | * | 5/1985 | Anderson | 160/174 R |
| 4,516,300 A | * | 5/1985 | Gaillard et al. | 29/24.5 |
| 5,263,529 A | | 11/1993 | Landis | |
| D343,323 S | | 1/1994 | Smith, Sr. | |
| 5,443,563 A | * | 8/1995 | Hindel et al. | 160/238 |
| 5,447,758 A | * | 9/1995 | Pelletier | 427/511 |
| 5,572,831 A | | 11/1996 | Rafiqui | |
| 5,613,436 A | * | 3/1997 | Taylor | 101/115 |
| 5,655,589 A | * | 8/1997 | Vartanian | 160/166.1 |
| 5,718,273 A | | 2/1998 | Best et al. | |
| 5,937,749 A | * | 8/1999 | Ford | 101/115 |
| 6,128,857 A | | 10/2000 | Morgan et al. | |
| 6,206,077 B1 | | 3/2001 | Stanfill | |
| D440,096 S | | 4/2001 | Railing | |

FOREIGN PATENT DOCUMENTS

GB        2176226 A    * 12/1986

* cited by examiner

*Primary Examiner*—M. Alexandra Elve
(74) *Attorney, Agent, or Firm*—Dale J. Ream

(57) ABSTRACT

A clamping apparatus for holding a louvered blind assembly while applying a decorative graphic thereto includes a pair of rectangular frames hingedly connected together for pivoting movement between an open position for receiving slats of the blind assembly, and a closed position in which the slats of the blind assembly are clamped therebetween. A slip resistant pad material is disposed on opposing faces of the frames for providing a soft, slip resistant surface for engaging the slats. First and second pairs of brackets are positioned at first and second ends of the clamping apparatus, respectively, for providing shelves for holding portions of the blind assembly that are not clamped between the top and bottom frames. Locating holes are formed in the brackets for aligning the clamping apparatus within a machine that applies the decorative graphic. A laser is used for etching and perforating graphic images and trimming blinds to length.

15 Claims, 6 Drawing Sheets

METHOD AND APPARATUS FOR CUSTOMIZING LOUVERED BLINDS

BACKGROUND OF THE INVENTION

1. Field of the Invention

The present invention relates generally to louvered blinds for windows, and in particular, to a method and apparatus for customizing traditional window blinds and shades with customized logos or other discernible patterns.

2. Description of the Related Art

Louvered blinds are widely used as functional coverings for windows and doors. Such louvered blinds may be horizontally oriented or vertically oriented. The present invention is directed to both horizontally and vertically oriented louvered blinds.

Often a need exists, or it is desirable, to decorate louvered blinds, as evidenced by prior art patents. For example, U.S. Pat. No. 5,572,831 issued to Rafiqui, U.S. Pat. No. 5,655,589 issued to Vartanian, and U.S. Pat. No. 5,718,273 issued to Best et al. each discloses a decorative system for louvered blinds in which individual movable slats are decorated with removable and exchangeable decorations. U.S. Des. Pat. No. 343,323 issued to Smith, Sr. and U.S. Des. Pat. No. 440,096 issued to Railing each discloses a decorated window blind in which an image or logo is applied to the slats of the blind. While each of these prior art patents discloses decorative coverings that may be functional for their intended purposes, they each involve a tedious and time-consuming process to attach the decorations to the individual slats of the blinds. None of these references teach a system for holding a plurality of slats of the blinds as the decorations are applied thereto.

U.S. Pat. No. 6,206,077 issued to Stanfill discloses an apparatus for making image-ladened louvered blinds in which a louver support bracket is used to hold the louvers in position while an adhesive decal is adhered to the louvers. The support bracket of Stanfill appears to include a plurality of louver supports that individually hold the louvers at a desired spacing, and a strap that secures the louvers to the bracket. However, Stanfill does not disclose a support bracket that would facilitate direct printing on assembled blinds.

Lasers have become a powerful tool for manufacturing and customization of consumer goods. Lasers are commonly used to mark products for labeling, identification numbers and company logos for both large and small quantity productions. Laser marking provides a permanent marking with high contrast that does not wear off or degrade with use. Laser engraving has begun replacing mechanical engraving for awards, plaques and personalized products. These laser engravers are available to small businesses for the customization of products with messages, names or monograms. An example of the use of laser marking is disclosed in U.S. Pat. No. 6,180,914 issued to Jones et al.

There is a need in the industry for an improved method and apparatus for customizing traditional window blinds to overcome these and other problems associated with the prior art.

SUMMARY OF THE INVENTION

An object of the present invention is to provide an improved method and apparatus for customizing traditional window blinds that overcome the problems and shortcomings of the prior art.

A further object of the present invention is to provide a clamping apparatus for conveniently holding a louvered blind assembly as a decorative graphic is applied thereto.

A further object of the present invention is to provide methods for customizing louvered blind assemblies using a laser system to create unique and attractive decorations and appearances.

A further object of the present invention is to provide an improved apparatus for customizing traditional window blinds that is economical to manufacture, easy and efficient to use, versatile to allow custom treatments to be applied to either side of the window blinds, and capable of a long operating life.

In order to accomplish these and other objects of the invention, a clamping apparatus is provided for holding a louvered blind assembly while applying a decorative graphic to the slats of the blind assembly. The clamping apparatus includes a pair of rectangular frames hingedly connected together for pivoting movement between an open position for receiving slats of the blind assembly, and a closed position in which the slats of the blind assembly are clamped therebetween. A slip resistant pad material is disposed on opposing faces of the frames for providing a soft, slip resistant surface for engaging the slats. First and second pairs of brackets are positioned at first and second ends of the clamping apparatus, respectively, for providing shelves for holding portions of the blind assembly that are not clamped between the top and bottom frames. Locating holes are formed in the brackets for aligning the clamping apparatus within a machine that applies the decorative graphic.

The present invention also includes methods of using a laser system for customizing louvered blind assemblies. The laser system can be used to etch or perforate graphic images on the slats of the blind assemblies, and to trim the individual slats of the blinds to length.

According to one aspect of the present invention, a blind clamping apparatus for holding a plurality of slats of a louvered blind assembly while a decorative graphic is applied to the slats is provided, comprising: a bottom frame having spaced apart right and left side portions arranged to extend generally perpendicular to the slats of the blind assembly to be held, and at least one connecting portion connecting the right and left side portions of the bottom frame; and a top frame having spaced apart right and left side portions that oppose the right and left side portions of the bottom frame, and at least one connecting portion connecting the right and left side portions of the top frame. The bottom frame is hingedly connected to the top frame for pivoting movement between an open position in which the top frame is spaced from the bottom frame for receiving the slats of the blind assembly therebetween, and a closed position in which the right and left side portions of the top frame are in close proximity to the right and left side portions of the bottom frame for clamping the slats of the blind assembly therebetween. The right and left side portions of the top and bottom frames define an exposed area therebetween for receiving a decorative graphic on the blind assembly.

According to another aspect of the present invention, a clamping apparatus for holding a louvered blind assembly while a decorative graphic is applied thereto is provided, comprising: a pair of frames that are hingedly connected together for pivoting movement between an open position for receiving slats of the blind assembly therebetween, and a closed position in which the slats of the blind assembly are clamped therebetween; means for securing the frames in their closed position; and bracket means attached to the frames for holding portions of the blind assembly that are not clamped between the frames.

According to another aspect of the present invention, a method of customizing a louvered blind assembly is provided, comprising the steps of: selecting a decorative graphic to be applied to the blind assembly; providing a clamping apparatus having top and bottom frames, each frame having spaced apart side portions for engaging top and bottom surfaces of the blind assembly, respectively; clamping a first plurality of slats of the blind assembly between the top and bottom frames with the side portions extending generally perpendicular to the plurality of slats; and applying the decorative graphic to an exposed portion of the plurality of slats between the spaced apart side portions.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 1b is a perspective bottom view of the blind clamping apparatus shown in FIG. 1a.

FIG. 3b is a detail side view of a portion of the bottom frame member of the blind clamping apparatus indicated by reference numeral 3b in FIG. 3a.

DETAILED DESCRIPTION OF THE PREFERRED EMBODIMENT

Figure 1A:
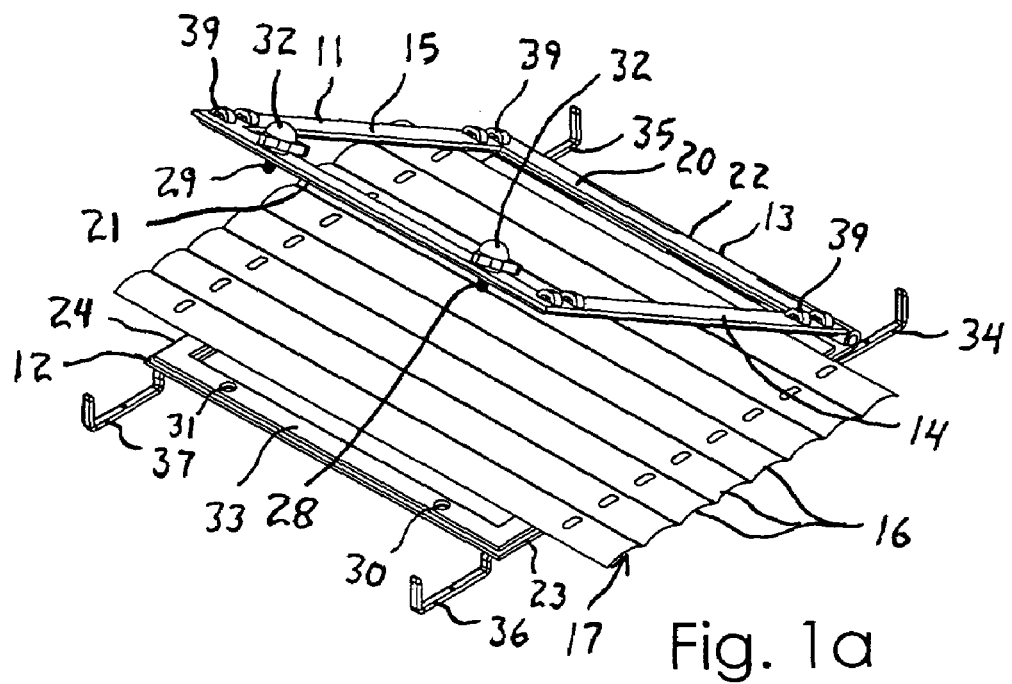
FIG. 1a is a perspective top view of a blind clamping apparatus according to the present invention with the top and bottom frames in an open position for receiving a plurality of slats of a louvered blind assembly.
Figure 1B:
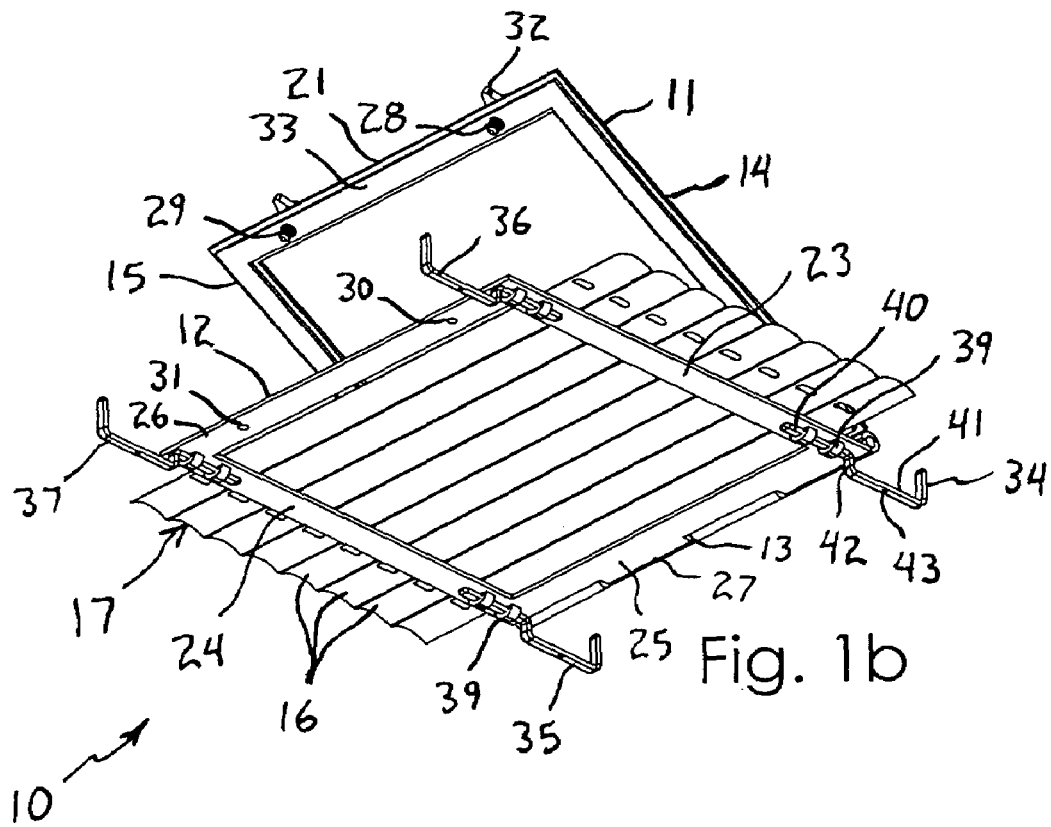

An apparatus and method for holding a plurality of slats of a louvered blind assembly while a graphic is applied thereto will now be described with reference to FIGS. 1 to 6 of the accompanying drawings.

The blind clamping apparatus 10 includes top and bottom frames 11, 12 that are hingedly connected together by a hinge 13 formed along one side thereof. The top frame 11 has a generally rectangular shape with spaced apart right and left side portions 14, 15 arranged to extend generally perpendicular to the slats 16 of the blind assembly 17 to be held. An exposed area 18 for receiving a decorative graphic 19 on the blind assembly 17 is created between the spaced apart side portions 14, 15. A first connecting portion 20 extends between respective first ends of the side portions 14, 15, and a second connecting portion 21 extends between respective second ends of the side portions 14, 15. A first part 22 of the hinge 13 is formed along the first connecting portion 20 of the top frame 11.

The bottom frame 12 also has a generally rectangular shape, which is a substantial mirror image of the top frame 11. The bottom frame 12 has right and left side portions 23, 24 arranged to extend generally perpendicular to the slats 16 of the blind assembly 17. A first connecting portion 25 extends between respective first ends of the side portions 23, 24, and a second connecting portion 26 extends between respective second ends of the side portions 23, 24. A second part 27 of the hinge 13 is formed along the first connecting portion 25 of the bottom frame 12. The second part 27 of the hinge 13 formed on the bottom frame 12 mates with the first part 22 of the hinge 13 formed on the top frame 11 to form the hinge 13. Other types of hinges can also be used with satisfactory results.

The bottom frame 12 is hingedly connected to the top frame 11 for pivoting movement between an open position (shown in FIGS. 1a, 1b, 3a and 3b) in which the top frame 11 is spaced from the bottom frame 12 for receiving the slats 16 of the blind assembly 17 therebetween, and a closed position (shown in FIGS. 2, 3c and 3d) in which the top and bottom frames 11, 12 are in close proximity for clamping the slats 16 of the blind assembly 17 therebetween. Specifically, in the closed position, at least the right and left side portions 14, 15 of the top frame 11 are in close proximity with the right and left side portions 23, 24 of the bottom frame 12, respectively, for clamping the slats 16 of the blind assembly 17 therebetween. The top and bottom frames 11, 12 are arranged to clamp the slats 16 of the blind assembly 17 around the area where the decorative graphic 19 is to be applied.

A pair of threaded fasteners 28, 29 are provided in the top frame 11 for mating with a pair of threaded openings 30, 31 in the bottom frame 12. The threaded fasteners 28, 29 are used to secure the top and bottom frames 11, 12 together in their closed position with the slats 16 of the blind assembly 17 sandwiched therebetween. The threaded fasteners 28, 29 are each provided with knobs 32 to facilitate manipulation by hand without the use of separate tools.

Figure 2:
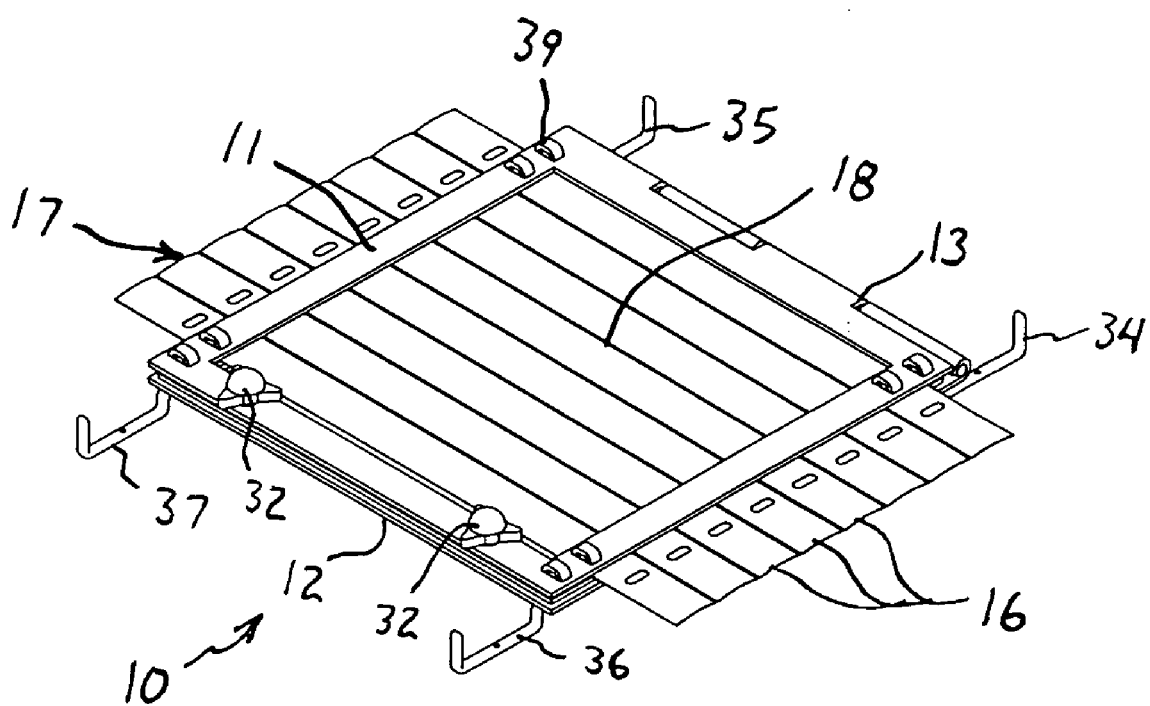
FIG. 2 is a perspective top view of the blind clamping apparatus with the top and bottom frames in a closed position for holding the slats of the louvered blind assembly while a decorative graphic is applied to the slats.
Figure 3A:
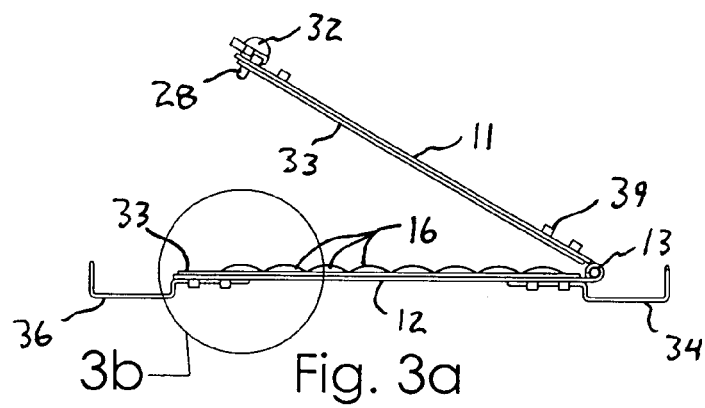
FIG. 3a is a side view of the blind clamping apparatus with the top and bottom frames in their open position.
Figure 3B:
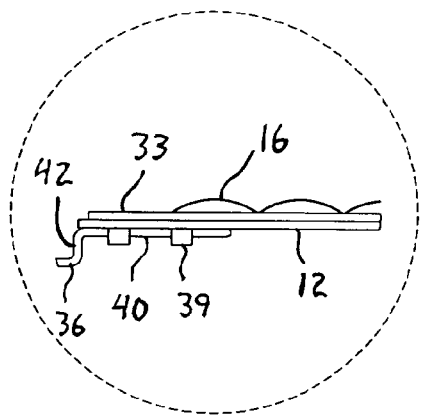
Figure 3C:
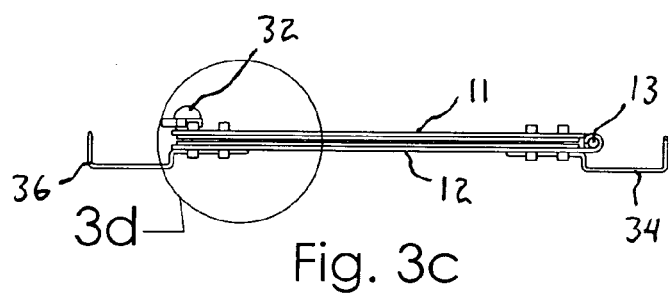
FIG. 3c is a side view of the blind clamping apparatus with the top and bottom frames in their closed position.
Figure 3D:
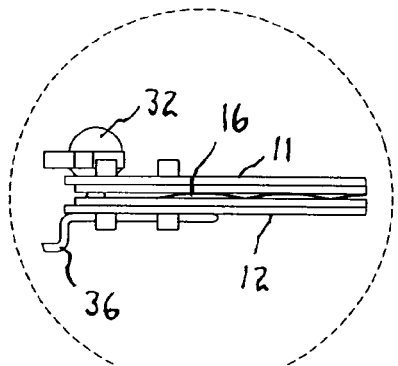
FIG. 3d is a detail side view of a portion of the clamping apparatus indicated by reference numeral 3d in FIG. 3c.

A slip resistant pad material 33, such as soft, deformable rubber, is disposed on opposing faces of at least the right and left side portions 14, 15, 23, 24 of the top and bottom frames 11, 12. The slip resistant pad material 33 provides a soft, slip resistant surface for engaging the slats 16 of the blind assembly 17 during use. The soft surface provided by the pad material 33 minimizes scratching or other damage to the slats 16, while the slip resistance provided by the pad material 33 helps maintain the slats 16 in the desired position as the decorative graphic 19 is applied. In the preferred embodiment, the pad material 33 is placed around the entire perimeter of the top and bottom frames 11, 12 to ensure that the blind slats 16 are not damaged when they are clamped between the frames 11, 12, and to distribute the clamping forces uniformly across all of the blind slats 16 held by the clamping apparatus 10. The pad material 33 allows the bend in each individual slat 16 to be substantially removed when the top and bottom frames 11, 12 are in their closed position, as shown in FIGS. 2, 3c and 3d.

A first pair of right and left brackets 34, 35 are positioned at a first end of the clamping apparatus 10, and a second pair of right and left brackets 36, 37 are positioned at the second end of the clamping apparatus 10. The first and second pairs of brackets 34–37 provide respective first and second shelves at each end of the clamping apparatus 10 for holding portions (not shown) of the blind assembly 17 that are not clamped between the top and bottom frames 11, 12. For example, if the blind assembly 17 has a total of twenty slats and only eight of the slats 16 are clamped between the top and bottom frames 11, 12 (as in FIG. 2), the other twelve slats can be conveniently placed in either or both of the shelves formed by the brackets 34–37 at each end of the clamping apparatus 10.

In FIGS. 1a to 3d, the brackets 34–37 are shown attached to the bottom frame 12. However, in the preferred embodiment, the brackets 34–37 can be attached to either one or both of the top and bottom frames 11, 12. Bosses 39 for removably attaching the brackets 34–37 to the frames 11, 12 are provided at each of the four corners of the top and bottom frames 11, 12. The brackets 34–37 are attached to the frames 11, 12 by inserting connecting stem portions 40 of the brackets 34–37 into the bosses 39 at the desired locations. The stem portions 40 are preferably held within the bosses 39 by a simple friction fit, which allows easy removal and rearrangement. The brackets 34–37 have generally L-shaped portions 41 that form shelves on which the slats 16 of the blind assembly 17 can be supported. The L-shaped portions 41 are preferably offset slightly from the connecting stem portions 40 by intermediate portions 42 to maintain a low profile of the clamping apparatus 10. The removable brackets 34–37 and removable threaded fasteners 28, 29 allow the top frame 11 to be more slender so that either of the frames 11, 12 can be slid easily between two adjacent slats 16 of a blind assembly 17 at a desired location.

Although the brackets 34–37 are shown attached to only one of the frames 12, it will be understood that additional brackets (not shown) can be attached to the other frame 11 to oppose the illustrated brackets 34–37. In this case, the brackets 34–37 on the bottom frame 12 will cooperate with the brackets (not shown) on the top frame 11 to support the portions (not shown) of the blind assembly 17 which are not clamped between the top and bottom frames 11, 12 as the clamping apparatus 10 is rotated or flipped over (e.g., to apply a decorative graphic to the opposite side of the blind assembly).

Locating holes 43 are provided in each of the brackets 34–37 for receiving locating pins (not shown) for aligning the clamping apparatus 10 within a machine (not shown) that applies the decorative graphic 19. The locating holes 43 and pins provide a reliable way to ensure that the blind assemblies 17 are positioned in the same position during production. This is an important feature for customizing multiple blind assemblies and accurately positioning the blind assemblies within the machine that applies the decorative graphic for repeatable results. In the case of a laser system being used to apply the graphic, the locating pins and holes 43 allow the computer controlling the laser to run the same program for multiple blind assemblies without modification. Cycle time in loading and unloading the laser or other machine is also reduced because the laser does not need to be calibrated as to the location of the blind assembly 17. The clamping apparatus 10 also positions the blind assembly 17 at the same height so that the laser does not have to be refocused between production runs.

The clamping apparatus 10 of the present invention can be used to hold the slats 16 of assembled or unassembled blinds. To customize blinds for an individual client at the point of purchase or after purchase, the ability to operate on assembled blinds is important. However, in certain large scale manufacturing instances, operating on unassembled blinds would provide a more effective method of marking.

The structure of the clamping apparatus 10 according to the present invention is described above. A method of using the clamping apparatus 10 to customize louvered blind assemblies 17 will now be described.

The clamping apparatus 10 is positioned over a blind assembly 17 by first removing the brackets (if any) and threaded fasteners 28, 29 with knobs 32 from the top frame 11. With the brackets and threaded fasteners removed, the top frame 11 is slid between two adjacent slats 16 of the blind assembly 17 and positioned with the top and bottom frames 11, 12 surrounding the area of the blind assembly 17 on which a graphic 19 is to be applied. The clamping apparatus 10 is then moved into its clamping position to clamp the slats 16 on which the graphic 19 is to be applied between the top and bottom frames 11, 12. The side portions 14, 15, 23, 24 of the top and bottom frames 11, 12 extend generally perpendicular to the slats 16 of the blind assembly 17. Any slats (not shown) which are not clamped between the top and bottom frames 11, 12 are held conveniently by the brackets 34–37 at each end of the clamping apparatus 10.

The clamping apparatus 10 with the blind assembly 17 held securely therein is then placed in a machine, such as a laser system, for applying the decorative graphic 19. The locating holes 43 in the brackets 34–37 are positioned over locating pins (not shown) within the machine to ensure proper alignment and repeatable results.

The Applicant's invention preferably uses a laser system (not shown) in conjunction with the clamping apparatus 10 to customize louvered blind assemblies 17, although other types of systems (e.g., ink jet or silk screen printing systems) can also be used with the clamping apparatus 10.

A laser system can specifically customize the blinds in three distinct processes, including: (1) etching a graphic; (2) creating a graphic through perforation; and (3) trimming a blind assembly to length. Primarily the laser system will be used to apply a graphic to the blinds by marking the blinds. This consists of using the beam of the laser to change the appearance of the individual slats 16 of the blind assembly 17. The exact marking process depends on the properties of the blind material. For example, plastic, metal and wood can all be marked using a laser using different process parameters.

A laser system consists of a laser, a marking head, a work area, and a computer. The article to be marked is placed in the work area. The computer and associated software converts a graphic image, usually in a vector format, into a series of paths for the laser to trace. The marking head consists of a couple of galvanometers that reflect the laser and move so that the reflected beam traces out the graphic image. The product is placed in the machine, the laser calibrated, and the part ran. The process is quick, repeatable, and well suited to either large or small runs.

The process of marking plastics using a laser system can take different forms depending on the type of plastic being marked. For example, the laser can engrave the material, bleach the surface of the material, or cause local melting and foaming. All of these processes have the desired effect of creating a distinct mark. The actual process depends on laser and material selection.

Marking metal using a laser system can also take different forms. For example, the laser can be used to burn off a surface coating such as paint. This creates a visible change in the appearance of the article by revealing the base color metal where the laser has been. In addition, a laser can bleach an anodized aluminum surface. This creates a white graphic on a dark surface, which is an attractive effect for certain graphics.

While less often used as a material for blinds, a laser can also mark wood. This creates a unique effect that cannot be achieved by traditional means. Material selection is an important consideration in the process and affects the appearance of the final product.

The preferred method according to the present invention will involve the use of a $CO_2$ laser system. Such laser systems are readily available as standard production equipment. For example, a sealed, air-cooled laser system in the 25–50 watt range can be used. Sealed lasers are self-contained units that do not need a constant supply of source gas. This increases service life of the laser to the 5,000 to 10,000 hour range. An air-cooled unit is much simpler than a water-cooled unit, thereby reducing costs and increasing reliability. Laser systems generate significant amounts of heat when generating the laser beam and must be cooled to extend component life to a reasonable level. $CO_2$ laser systems are also very cost effective at both the large manufacturing level and for producing single units.

Of course other types of laser systems could be used to produce the same or alternative effects within the scope of the present invention. For example, the Yttrium Aluminum Garnet (YAG) laser, which is usually a more powerful and expensive laser, can be used to provide a different type of mark on certain materials.

Figure 5:
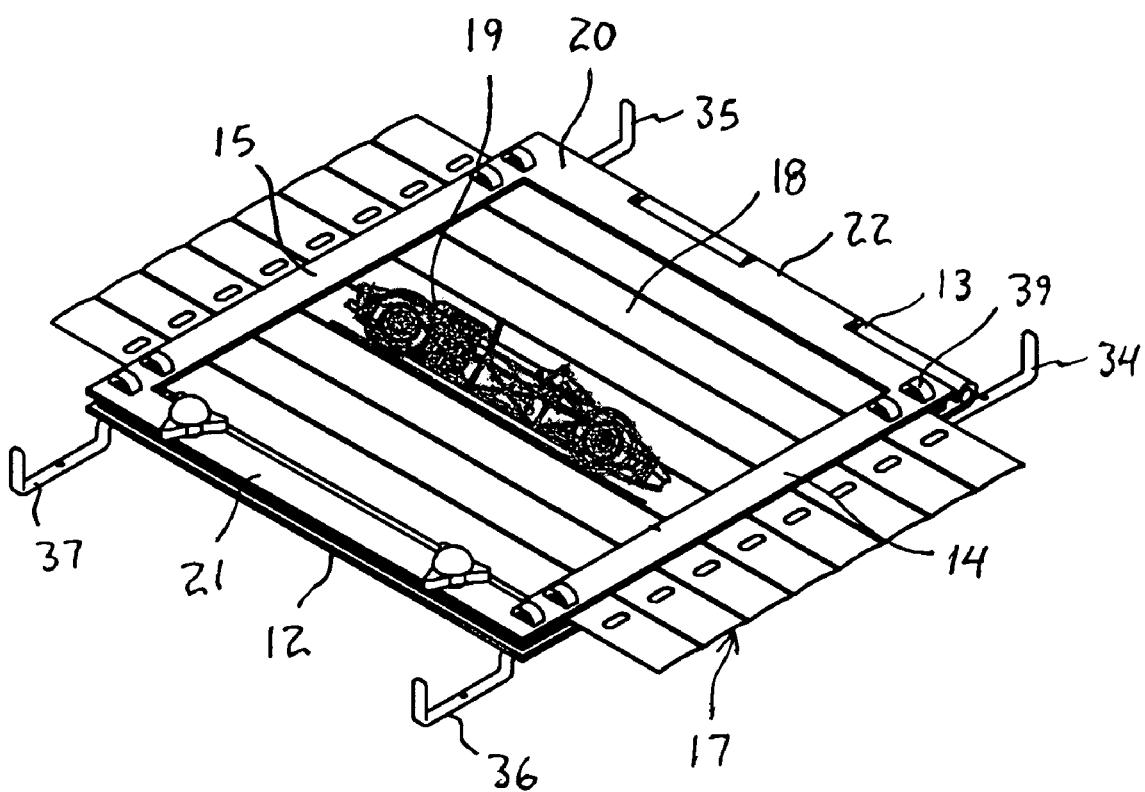
FIG. 5 is a perspective view of the blind clamping apparatus similar to FIG. 2, showing a decorative graphic printed on the slats of the louvered blind assembly.
Figure 6:
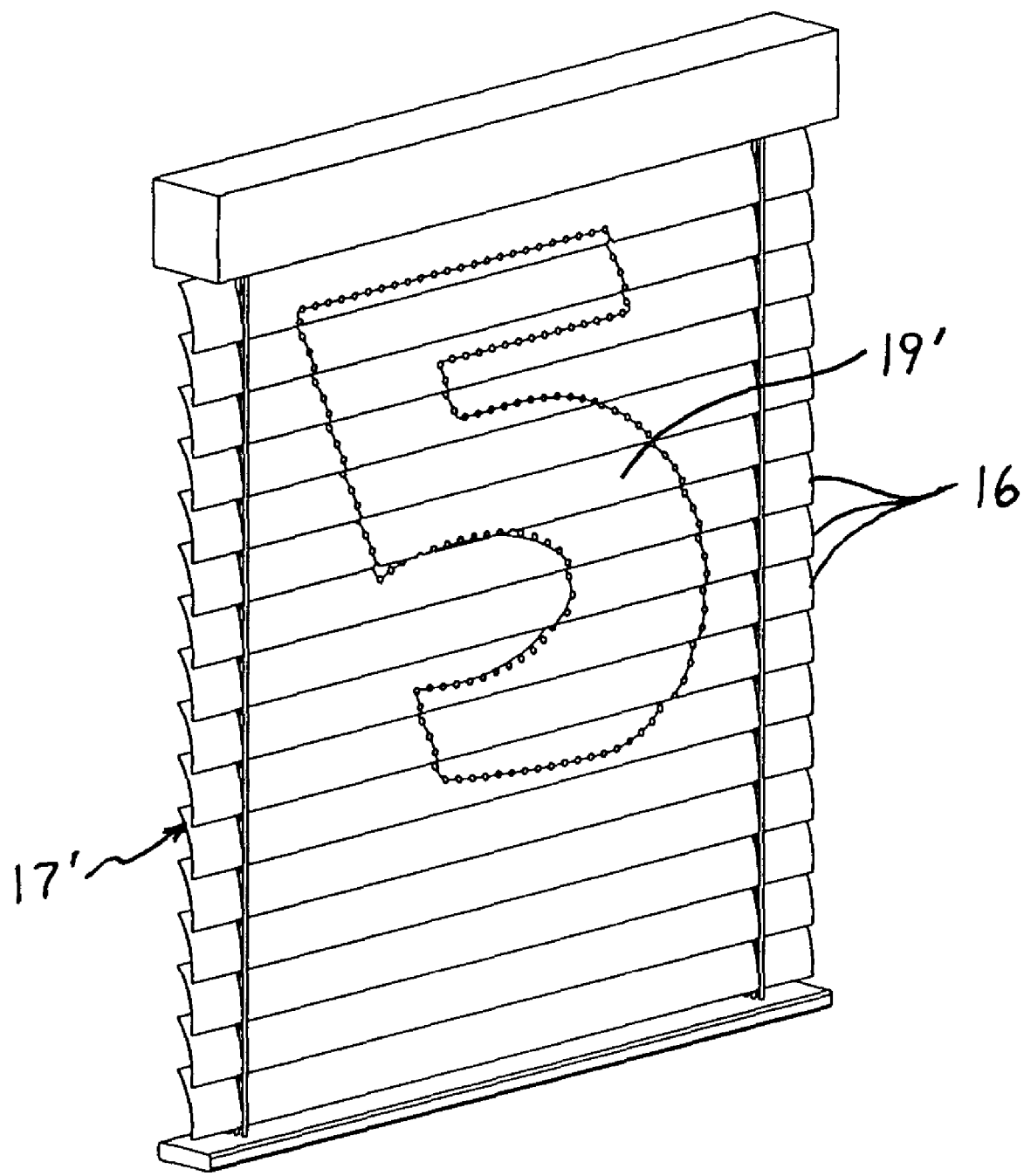
FIG. 6 is a perspective view of a louvered blind assembly having a decorative graphic formed on the slats by cutting a series of holes in the slats using a laser.

As noted above, the laser system can be used to provide various treatments for blind assemblies held by the clamping apparatus. The most common and preferred treatment will likely be laser etching of graphics on the slats of the blind assembly. In this case, the blind is first loaded into the clamping apparatus. The graphic design is then loaded into the computer-controlled laser-marking machine, and converted into a series of paths for the laser to traverse. The loaded clamping apparatus is then placed in the machine and the graphic program is run. The laser would be set to a lower power as to only mark the surface of the slats and not cut the material. This is a setup parameter that would need to be tested on a material selection basis. FIG. 5 shows a blind assembly after being loaded into the clamping apparatus and etched using the laser to form the decorative graphic 19.

Another treatment provided by the laser system is to create a graphic through perforation. When operating at a higher power, the laser can cut material. This allows the laser to create the unique effect of perforating an outline of a graphic image 19' by pulsing the laser to a higher power level while tracing the image. This effect can be seen in the blind assembly 17' shown in FIG. 6. This effect has unique opportunities in a blind assembly when the perforated outline of the graphic image 19' can be illuminated with light from the other side. The laser perforation process would create small, uniform holes around the intricate curves on multiple surfaces of the slats 16.

Figure 4:
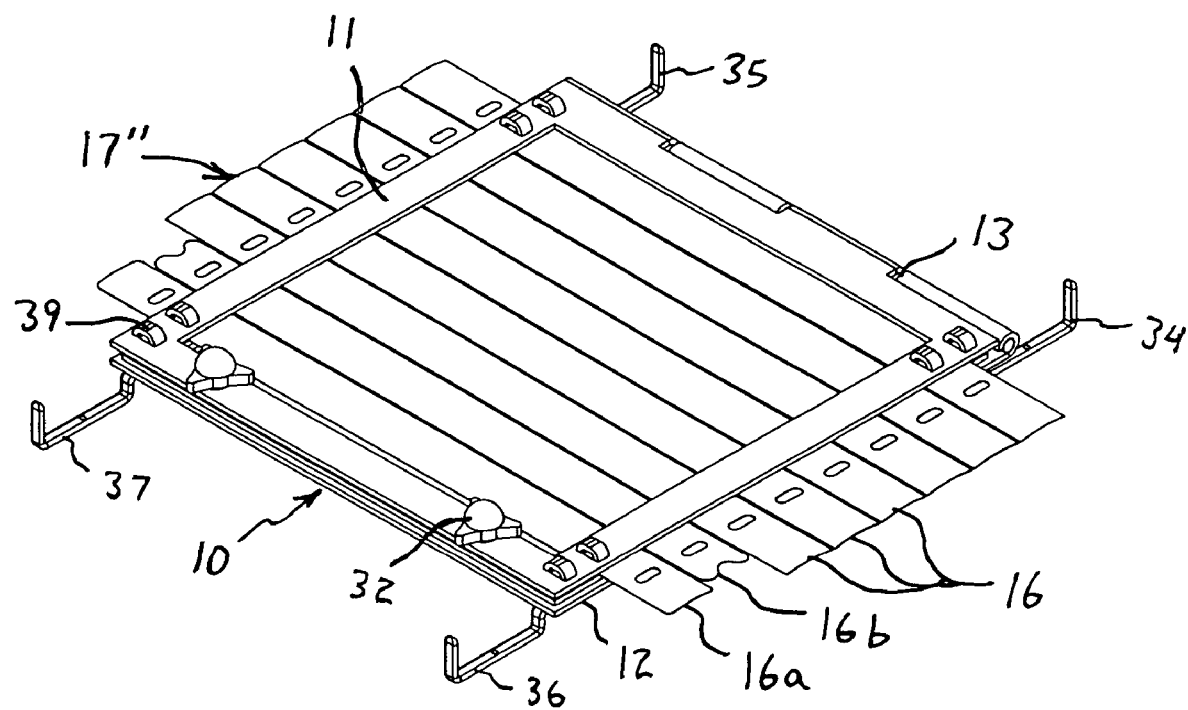
FIG. 4 is a perspective view of the blind clamping apparatus similar to FIG. 2, showing how a laser can be used to cut the ends of the slats while a louvered blind assembly is held by the clamping apparatus of the present invention.

Another treatment provided by the laser system is to trim the slats 16 of the blind assembly to a desired length. High quality blinds and window treatments are often custom fitted to a particular window or door. Taking advantage of the laser's ability to cut at higher power settings allows the blinds to be trimmed to length in the same process as the graphics marking. FIG. 4 shows the clamping apparatus 10 with a blind assembly 17" having slats 16 in cut and uncut states. The laser process can trim the edges of the slats in a conventional straight cut, as indicated by reference numeral 16*a*. In addition, with the ability to position the laser beam, the laser can trace curves or other patterns on the edges and ends of the blind slats for a unique look, as indicated by reference numeral 16*b*.

The use of a laser marking system with the clamping apparatus 10 according to the present invention creates a unique product for discriminating customers demanding a professional image for the decoration of their window shades and blinds. In addition to creating the graphics on the blinds, the laser system can decorate blinds in previously undone manners. This includes creating a perforated outline of a graphic (FIG. 6) and trimming the edges of the slats of a blind assembly with curves or other patterns (FIG. 4). In addition, the high power cutting setting on the laser can be used to cut the blinds to length for a custom fit. These unique features create a superior product that will appeal to a wide market because each individual client can select the graphics. This system provides an unsurpassed level of mass customization in an efficient manner to the window treatment market.

References herein to a window should not be construed as limited to a window, but should be understood to include an application of the invention to louvered blind assemblies for doors or other openings as well.

While the invention has been specifically described in connection with specific embodiments thereof, it is to be understood that this is by way of illustration and not of limitation, and the scope of the appended claims should be construed as broadly as the prior art will permit.

What is claimed is:

1. A blind clamping apparatus for holding a plurality of slats of a louvered blind assembly while a decorative graphic is applied to the slats, comprising:

a bottom frame having spaced apart right and left side portions arranged to extend generally perpendicular to the slats of the blind assembly to be held, and at least one connecting portion connecting the right and left side portions of the bottom frame;

a top frame having spaced apart right and left side portions that oppose the right and left side portions of the bottom frame, and at least one connecting portion connecting the right and left side portions of the top frame;

said bottom frame being hingedly connected to said top frame for pivoting movement between an open position in which the top frame is spaced from the bottom frame for receiving the slats of the blind assembly therebetween, and a closed position in which the right and left side portions of the top frame are in close proximity to the right and left side portions of the bottom frame for clamping the slats of the blind assembly therebetween, whereby the right and left side portions of the top and bottom frames define an exposed area therebetween for receiving a decorative graphic on the blind assembly;

at least one bracket disposed at an end of one of said top and bottom frames for holding a portion of the blind assembly which is not clamped between the top and bottom frames;

wherein said bracket is removably attached to said one of said top and bottom frames.

2. The blind clamping apparatus according to claim 1, wherein each of said top and bottom frames has a boss for receiving said bracket, and said bracket is removably attachable to either of said top and bottom frames.

3. The blind clamping apparatus according to claim 1, wherein said at least one bracket comprises a first pair of right and left brackets positioned at a first end of the clamping apparatus, and a second pair of right and left brackets positioned at a second end of the clamping apparatus, said first and second pairs of brackets providing respective first and second shelves at each end of the clamping apparatus for holding portions of the blind assembly which are not clamped between the top and bottom frames.

4. The blind clamping apparatus according to claim 3, wherein each of said top and bottom frames has respective pairs of right and left bosses at each end thereof for receiving said brackets, and said brackets are selectively attachable to either or both of said top and bottom frames.

5. The blind clamping apparatus according to claim 1, wherein said bracket comprises a first portion for attaching to a boss on one of the top arid bottom frames, and a second generally L-shaped portion that forms a shelf on which slats of the blind assembly can be supported.

6. The blind clamping apparatus according to claim 1, wherein said at least one bracket comprises a first bracket attached to the top frame and a second bracket attached to the bottom frame opposing the first bracket, said first and second brackets cooperating with each other to support the slats of the blind assembly which are not clamped between the top and bottom frames as the clamping apparatus is rotated.

7. The blind clamping apparatus according to claim 1, wherein said at least one bracket has a locating hole formed therein for aligning the clamping apparatus within a machine that applies the decorative graphic.

8. The blind clamping apparatus according to claim 1, further comprising a threaded fastener means for securing the top and bottom frames together in their closed position with the slats of the blind assembly sandwiched therebetween.

9. The blind clamping apparatus according to claim 1, further comprising a slip resistant pad material disposed on opposing faces of the right and left side portions of the top and bottom frames for providing a soft, slip resistant surface for engaging the slats of the blind assembly.

10. The blind clamping apparatus according to claim 1, wherein the top and bottom frames are generally rectangular with connecting portions extending between each end of the right and left side portions, wherein one of the connecting portions of the bottom frame is hingedly connected to one of the connecting portions of the top frame by a hinge, and further comprising a means for selectively fastening the other one of the connecting portions of the bottom frame to the other one of the connecting portions of the top frame to secure the top and bottom frames together in their closed position.

11. The blind clamping apparatus according to claim 10, further comprising structures at each of the four corners of the top and bottom frames for removably attaching a plurality of brackets for holding slats of a blind assembly which are outside the rectangular shape defined by the top and bottom frames.

12. The blind clamping apparatus according to claim 11, wherein the plurality of brackets each comprises a connecting stem, and a generally L-shaped support portion extending from said connecting stem.

13. A clamping apparatus for holding a louvered blind assembly while a decorative graphic is applied thereto, comprising:
  a pair of frames that are hingedly connected together for pivoting movement between an open position for receiving slats of the blind assembly therebetween, and a closed position in which the slats of the blind assembly are clamped therebetween;
  means for securing the frames in their closed position;
  bracket means attached to the frames for holding portions of the blind assembly that are not clamped between said frames; and
  said frames each have spaced apart side portions arranged to extend perpendicular to the slats of the blind assembly, whereby an exposed area for receiving a decorative graphic on the blind assembly is created between the spaced apart side portions;
  a slip resistant pad material disposed on opposing faces of the frames for providing a soft, slip resistant surface for engaging the slats of the blind assembly.

14. The clamping apparatus for holding a louvered blind assembly according to claim 13, wherein said bracket means comprises a first pair of right and left brackets positioned at a first end of the clamping apparatus, and a second pair of right and left brackets positioned at a second end of the clamping apparatus, said first and second pairs of brackets providing respective first and second shelves at each end of the clamping apparatus for holding portions of the blind assembly which are not clamped between the top and bottom frames.

15. The system for holding a louvered blind assembly according to claim 14, wherein at least one of said brackets has a locating hole formed therein for aligning the clamping apparatus within a machine that applies the decorative graphic.

* * * * *